(12) United States Patent
Raz et al.

(10) Patent No.: US 12,619,459 B2
(45) Date of Patent: May 5, 2026

(54) EXTENDING PARALLEL SOFTWARE THREADS

(71) Applicant: Next Silicon Ltd, Tel Aviv (IL)

(72) Inventors: Elad Raz, Ramat Gan (IL); Ilan Tayari, Tzur Hadassa (IL); Dan Shechter, Tel Aviv (IL)

(73) Assignee: Next Silicon Ltd, Givatayim (IL)

( * ) Notice: Subject to any disclaimer, the term of this patent is extended or adjusted under 35 U.S.C. 154(b) by 795 days.

(21) Appl. No.: 17/575,696

(22) Filed: Jan. 14, 2022

(65) Prior Publication Data

US 2023/0229489 A1     Jul. 20, 2023

(51) Int. Cl.
| | |
|---|---|
| *G06F 9/46* | (2006.01) |
| *G06F 8/41* | (2018.01) |
| *G06F 9/48* | (2006.01) |
| *G06F 9/54* | (2006.01) |

(52) U.S. Cl.
CPC ............. *G06F 9/4843* (2013.01); *G06F 8/45* (2013.01); *G06F 8/456* (2013.01); *G06F 9/46* (2013.01); *G06F 9/54* (2013.01); *G06F 2209/5018* (2013.01)

(58) Field of Classification Search
CPC . G06F 9/46; G06F 9/5066; G06F 9/48; G06F 9/4843; G06F 8/445; G06F 8/45; G06F 8/456; G06F 2209/5018; G06F 9/4806; G06F 9/4881
See application file for complete search history.

(56) References Cited

U.S. PATENT DOCUMENTS

| | | | | |
|---|---|---|---|---|
| 5,748,489 | A * | 5/1998 | Beatty ................. | G06F 30/3312 |
| | | | | 716/108 |
| 9,043,771 | B1 * | 5/2015 | Vardhan ............... | G06F 8/4435 |
| | | | | 717/151 |
| 9,069,605 | B2 * | 6/2015 | Hankins ............... | G06F 9/4843 |
| 9,436,475 | B2 * | 9/2016 | Chakrabarti .......... | G06F 9/5016 |
| 11,030,073 | B2 * | 6/2021 | Idicula ............... | G06F 11/3024 |
| 11,354,157 | B2 * | 6/2022 | Voitsechov ......... | G06F 13/4022 |
| 2007/0130568 | A1 * | 6/2007 | Jung .................... | G06F 9/5066 |
| | | | | 718/104 |

(Continued)

OTHER PUBLICATIONS

European Search Report and the European Search Opinion Dated May 22, 2023 From the European Patent Office Re. Application No. 23151467. (11 Pages).

*Primary Examiner* — Lewis A Bullock, Jr.
*Assistant Examiner* — John Robert Dakita Ewald

(57) ABSTRACT

A method for executing a software program, comprising: identifying in a program a plurality of host threads, each for performing some of a plurality of parallel sub-tasks of a task; and for each of the host threads: generating device threads, each associated with the host thread, each for one of the parallel tasks associated thereof; generating a parent thread associated with the host thread for communicating with the device threads; configuring a host processing circuitry to execute the parent thread; and configuring at least one other processing circuitry to execute in parallel the device threads while the host processing circuitry executes the parent thread; and for at least one of the host threads: receiving by the parent thread a value from the at least one other processing circuitry, the value generated when executing at least one of the device threads associated with the at least one host thread.

18 Claims, 6 Drawing Sheets

(56)               References Cited

U.S. PATENT DOCUMENTS

| | | |
|---|---|---|
| 2007/0150900 A1 | 6/2007 | Hankins |
| 2007/0226696 A1* | 9/2007 | Radhakrishnan ....... G06F 8/456 |
| | | 717/127 |
| 2009/0150890 A1* | 6/2009 | Yourst ................... G06F 9/3842 |
| | | 718/102 |
| 2011/0191775 A1* | 8/2011 | Omara ................... G06F 9/544 |
| | | 718/102 |
| 2014/0130052 A1* | 5/2014 | Lin ......................... G06F 9/522 |
| | | 718/102 |
| 2018/0181398 A1* | 6/2018 | Scherbinin ........... G06F 9/3017 |

* cited by examiner

100A

100B

400

400

EXTENDING PARALLEL SOFTWARE THREADS

FIELD AND BACKGROUND OF THE INVENTION

Some embodiments described in the present disclosure relate to a computerized system and, more specifically, but not exclusively, to a computerized system with a plurality of processing circuitries.

In the field of computer science, a thread of execution is a sequence of computer instructions that can be managed independently by a scheduler. A process is an instance of a software program that is being executed. The term multi-threading, as used herewithin, refers to a model of program execution that allows for multiple threads to be created within a process, executing independently but concurrently sharing resources of the process. Some examples of a resource of the process are computing circuitry, memory address space, cache memory address translation buffers, values of some global variables and dynamically allocated variables, and some access privileges. Multithreading aims to increase utilization of a single processing core, for example a central processing unit (CPU) or a single core in a multi-core processor, by interleaving execution of a plurality of threads on the single processing core. Thus, a multithreaded software program is a software program that is executed in a process comprising a plurality of threads, where the threads execute concurrently, sharing resources of the process.

The term multiprocessing, in computer science, refers to concurrent processing on multiple processing cores, for example a multi-core processor or a plurality of hardware processing circuitries. Multiprocessing may apply both to executing multiple processes in parallel on multiple processing cores, and to executing multiple threads of a single process in parallel on multiple processing cores. The current disclosure focuses on executing multiple threads of a single process in parallel on multiple processing cores, but is not limited thereto.

Some modern programming models combine multi-threading with multiprocessing to increase performance of a system executing a software program, for example to increase an amount of tasks performed by the system (throughput) and additionally or alternatively to reduce an amount of time it takes the system to perform a task (latency).

SUMMARY OF THE INVENTION

It is an object of some embodiments of the present disclosure to describe a system and a method for executing a software program where the software program has a task comprising a plurality of parallel sub-tasks and where executing the software program comprises executing a plurality of parallel host threads, each for performing some of the plurality of parallel sub-tasks. In some such embodiments, for each of the plurality of parallel host threads a plurality of device threads are each executed on one of one or more processing circuitries for performing one of the respective plurality of parallel sub-tasks of the host thread, and a parent thread associated with the host thread is executed on a host processing circuitry for communicating with the plurality of device threads.

The foregoing and other objects are achieved by the features of the independent claims. Further implementation forms are apparent from the dependent claims, the description and the figures.

According to a first aspect, a method for executing a software program comprises: identifying in a software program a plurality of host threads, each for performing some of a plurality of parallel sub-tasks of a task of the software program; and for each of the plurality of host threads: generating a plurality of device threads, each associated with the host thread, each for one of the respective some of the plurality of parallel tasks associated thereof; generating a parent thread associated with the host thread for communicating with the plurality of device threads; configuring a host processing circuitry to execute the parent thread; and configuring at least one other processing circuitry, connected to the host processing circuitry, to execute in parallel the plurality of device threads while the host processing circuitry executes the parent thread; and for at least one of the plurality of host threads: receiving by the parent thread associated with the at least one host thread at least one value from the at least one other processing circuitry, the at least one value generated by the at least one other processing circuitry executing at least one of the plurality of device threads associated with the at least one host thread. Executing on the host processing circuitry a parent thread associated with a host thread of the software program and with a plurality of device threads executing on one or more other processing circuitries while the parent thread executes allows increasing an amount of threads executing in parallel the plurality of parallel sub-tasks of the software program beyond the amount of parallel threads supported by an operating system of the system, reducing latency of executing the plurality of sub-tasks and additionally or alternatively increasing throughput of executing the plurality of sub-tasks. Receiving by the parent thread one or more values generated by executing one or more of the plurality of device threads increases usability of a system compared to a system where the plurality of device threads cannot send a value generated thereby to the parent thread, for example by allowing the parent thread use the value when accessing a shared computer resource on behalf of the one or more device threads, or in another example allowing the parent thread to use the value when executing another part of the software program.

According to a second aspect, a system for executing a software program comprises at least one hardware processor adapted for: identifying in a software program a plurality of host threads, each for performing some of a plurality of parallel sub-tasks of a task of the software program; and for each of the plurality of host threads: generating a plurality of device threads, each associated with the host thread, each for one of the respective some of the plurality of parallel tasks associated thereof; generating a parent thread associated with the host thread for communicating with the plurality of device threads; configuring a host processing circuitry to execute the parent thread; and configuring at least one other processing circuitry, connected to the host processing circuitry, to execute in parallel the plurality of device threads while the host processing circuitry executes the parent thread; wherein for at least one of the plurality of host threads, executing in parallel the respective plurality of device threads associated therewith comprises receiving by the parent thread associated therewith at least one value from the at least one other processing circuitry, the at least one value generated by the at least one other processing circuitry executing at least one of the plurality of device threads associated with the at least one host thread.

With reference to the first and second aspects, in a first possible implementation of the first and second aspects at least some host threads of the plurality of host threads are identified in a source code of the software program. Optionally, the source code of the software program comprises a marking, indicative of at least some of the plurality of parallel sub-tasks, and identifying the at least some host threads is according to the marking. Optionally, the marking in the source code is implemented using at least one multithreading application programming interface (API) selected from a group of multithreading APIs consisting of: OpenMP Architecture Review Board Open Multi-Processing (OpenMP) API, OpenACC, Message Passing Interface (MPI), and Intel Threading Building Blocks (TBB). Using a marking in the source code to identify at least some of the plurality of host thread allows a programmer more control over parallel execution of the plurality of parallel sub-tasks, increasing ease of programming and increasing performance of a system executing the software program.

With reference to the first and second aspects, in a second possible implementation of the first and second aspects at least some other host threads of the plurality of host threads are identified in a binary code of the software program. Optionally, the binary code of the software program comprises another marking, indicative of at least one code region. Optionally, at least one of the plurality of host threads is configured for executing the at least one code region. Optionally, identifying the at least some other host threads is according to the other marking. Using a marking in the binary code to identify at least some other host threads of the plurality of host thread allows runtime identification of these host threads, reducing complexity of implementation and cost of implementation to increase performance of a system executing the software program.

With reference to the first and second aspects, in a third possible implementation of the first and second aspects the host processing circuitry is the at least one hardware processor. Optionally, the at least one hardware processor is further adapted for generating the plurality of device threads, generating the parent thread, configuring the host processing circuitry and configuring the least one other processing circuitry while executing the software program. Optionally, the at least one hardware processor is further adapted for identifying the plurality of host threads while executing the software program. Using the host processing circuitry as the at least one hardware processor and identifying the plurality of host threads, generating the plurality of device threads, generating the parent thread, configuring the host processing circuitry and configuring the least one other processing circuitry while executing the software program allows on-the-fly increasing of the performance of the system executing the software program, reducing an amount of time one or more services provided by the system are interrupted.

With reference to the first and second aspects, in a fourth possible implementation of the first and second aspects the at least one other processing circuitry is an interconnected computing grid. Optionally, for each of the plurality of host threads configuring the at least one other processing circuitry comprises, for each of the plurality of device threads associated with the host thread, generating a dataflow graph and projecting the dataflow graph on part of the interconnected computing grid. Optionally, the interconnected computing grid comprises a plurality of reconfigurable logical elements, and projecting the dataflow graph on part of the interconnected computing grid comprises reconfiguring at least some of the reconfigurable logical elements. Using an interconnected computing grid with a plurality of reconfigurable logical elements allows on-the-fly increasing of the performance of the system executing the software program, reducing an amount of time one or more services provided by the system are interrupted.

With reference to the first and second aspects, in a fifth possible implementation of the first and second aspects the system further comprises at least one shared computing resource connected to the host processing circuitry. Optionally, the host processing circuitry is further configured for accessing the at least one shared computing resource in response to the at least one parent thread receiving the at least one value from the at least one other processing circuitry. Optionally, the at least one shared computing resource is selected from a group of computing resources consisting of: a memory area, a non-volatile storage, a co-processor, a digital communication network interface, a monitor, and an input device. Configuring the host processing circuitry to access the one or more shared computing resource in response to receiving one or more values from the one or more other processing circuitries allows executing on the one or more other processing circuitries at least some of the plurality of parallel sub-tasks which require access to the one or more shared computing resources connected to the host processing circuitry, increasing usability of the system.

With reference to the first and second aspects, in a sixth possible implementation of the first and second aspects the at least one hardware processor is further adapted for accessing a plurality of statistical values collected while executing the software program. Optionally, the plurality of device threads is generated further according to the plurality of statistical values. Optionally, the software program comprises a plurality of telemetry instructions for collecting at least some of the plurality of statistical values. Optionally, at least one of the plurality of statistical values is selected from the group of statistical values consisting of: a statistical value indicative of a value of a program counter, a statistical value indicative of executing a loop, a statistical value indicative of invoking a first execution block from a second execution block, a statistical value indicative of a data value, for example a frequently used data value or a variable data value, a statistical value indicative of a range of data values, a statistical value indicative of a pattern of a plurality of data values, a statistical value indicative of memory utilization, and a statistical value indicative of a bandwidth of a plurality of memory accesses. Generating the plurality of device threads further according to the plurality of statistical values increases accuracy of the generated plurality of device threads, for example accuracy of distribution of the parallel sub-tasks among the plurality of device threads, and additionally or alternatively accuracy of distribution of the plurality of device threads among the plurality of other processing circuitries. Increasing accuracy of the plurality of device threads increases performance of the system when executing the software program. Using telemetry instructions in the software program to collect at least some of the plurality of statistical values increases accuracy of the plurality of statistical values and thus accuracy of the plurality of device threads.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DESCRIPTION OF SPECIFIC EMBODIMENTS OF THE INVENTION

Figure 1A:
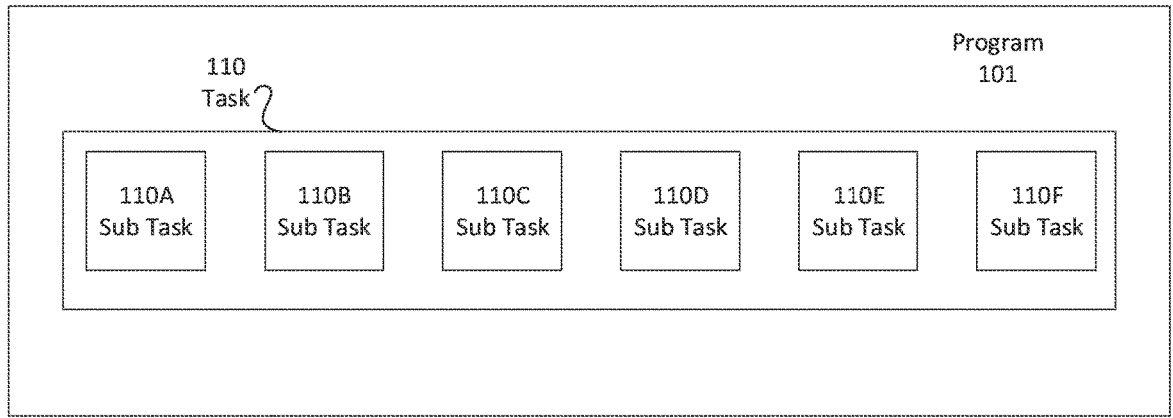
FIGS. 1A and 1B are schematic block diagrams of an exemplary software program, according to some embodiments.

As performance requirements of computerized systems increase, it is increasingly common for a system to have a plurality of processing circuitries and there is a need to increase the use of multiprocessing when executing a software program on such a system. One common approach is to divide a task of the software program into a plurality of sub-tasks that may be executed in parallel (i.e. a plurality of parallel sub-tasks), and to allocate each sub-task to a separate processing circuitry. In some existing systems that support multiprocessing a thread is created for each of the plurality of sub-tasks, and a plurality of threads for performing the plurality of sub-tasks are executed in parallel, each allocated to a separate processing circuitry. In such implementations the plurality of threads is all of the same software program and thus share resources of the software program such as memory address space, access privileges, and variable values. In some existing systems the plurality of parallel sub-tasks is divided into a plurality of sets of sub-tasks, each set comprising some of the plurality of sub-tasks, and a thread is created for each set of sub-tasks and allocated to a separate processing circuitry.

Executing a software program by executing a plurality of threads typically requires support from an operating system of the system executing the software program. In such systems, each of the software program's plurality of threads is executed as one execution thread of the operating system. To manage the plurality of threads, the operating system typically has resources for maintaining thread management information. Most operating systems limit the amount of threads that can be supported simultaneously, typically according to the amount of resources for managing the plurality of threads. In some systems the amount of threads that can be supported simultaneously is limited by an amount of memory allocated to managing the plurality of threads. In some systems it may be that even when the amount of threads in the plurality of threads is supported by the operating system, in practice scheduling of the plurality of threads results in a decrease in the system's performance, for example due to context switching overhead.

As a result, the amount of threads that can be executed in parallel is limited by the amount of threads supported by the operating system of the system. As a result, in such systems the amount of threads for performing the plurality of parallel sub-tasks of the task of the software program is limited by the amount of threads supported by the operating system. However, it may be the case that the plurality of processing circuitries of the system can support parallel execution of more threads than can be supported by the operating system, that is the plurality of processing circuitries is not fully utilized. There is a need to increase utilization of the plurality of processing circuitries in order to increase performance of the system executing the software program.

The present disclosure proposes, in some embodiments described herewithin, expanding each host thread of a plurality of parallel host threads of a software program into a plurality of device threads associated therewith for execution in parallel by one or more processing circuitries of a plurality of processing circuitries of the system. When each host thread is for performing some of the plurality of parallel sub-tasks of the task of the software program, each device thread is optionally for performing one of the respective some of the plurality of parallel sub-tasks of the host thread associated therewith.

Optionally, the plurality of parallel host threads is a plurality of threads for executing at least part of the software program. Optionally, the plurality of host threads are supported by an operating system of a system executing the software program. Optionally, scheduling of the host thread is managed by the operating system. Optionally, scheduling of the plurality of device threads is not managed by the operating system. Executing a plurality of device threads whose scheduling is not managed by an operating system that schedules execution of the host thread enables increasing utilization of the plurality of processing circuitries, for example by enabling execution in parallel of more threads than supported by the operating system, thus enables thereby increasing an amount of sub-tasks of the plurality of parallel sub-tasks that are executed in parallel and so increasing performance of the system when performing the task of the software program.

Optionally, to allow communication between the plurality of device threads and other parts of the software program, the present disclosure proposes creating for each host thread a parent thread associated therewith for execution on a host processing circuitry of the plurality of processing circuitries while the one or more processing circuitries of the plurality of processing circuitry execute the plurality of device threads, such that the plurality of device threads are executed in parallel to each other and in parallel to the parent thread. Optionally, the parent thread is executed instead of the host thread. Optionally, execution of the parent thread is managed by an operating system managing the host processing circuitry. Optionally the operating system does not manage the one or more processing circuitries. Optionally, the parent thread enables the respective plurality of device threads associated with the host thread access to one or more shared computing resources of the software program. Optionally, the one or more shared computing resources are managed by the operating system managing the host processing circuitry.

Optionally, for at least one of the plurality of parallel host threads, the respective parent thread associated therewith receives one or more values from the one or more processing circuitries, where the one or more values are generated by the one or more processing circuitries when executing one or more device threads of the respective plurality of device threads associated with the at least one host thread. Receiving by a parent thread a value from a device thread enables the device thread to communicate with other parts of the software program. Receiving a value generated by the device thread increases usability of the plurality of device threads compared to receiving a predefined value.

Optionally, in response to receiving the one or more values, the parent thread accesses one or more shared computing resources, for example a memory area of the host processing circuitry or a communication device connected to the host processing circuitry. Optionally, the one or more values include a value to be stored in a shared memory area connected to the host processing circuitry. Optionally, the one or more values include a handle for accessing a device connected to the host processing circuitry. Receiving the one or more values by the parent thread enables the device thread to access the one or more shared computing resources, for example the shared memory area and additionally or alternatively the device, despite the device thread not being managed by the operating system managing the host processing circuitry.

Optionally, the plurality of device threads, the parent thread, configuration of the host processing circuitry and configuration of the one or more processing circuitries are executed during runtime of the software program, i.e. while a processing circuitry executes the software program. Optionally, at least some of the plurality of parallel host threads are identified while the processing circuitry executes the software program. Optionally, at least some other of the plurality of parallel host threads are identified when compiling the software program, i.e. when generating a plurality of computer executable instructions from a source code of the software program.

In some embodiments, the one or more processing circuitries are an interconnected computing grid. Optionally, an interconnected computing grid comprises a plurality of reconfigurable logical elements connected by a plurality of configurable data routing junctions. An example of a reconfigurable logical element is processing circuitry that may be configured to perform one of an identified set of mathematical and logical operations. Some examples of a mathematical operation are addition and subtraction. Some examples of a logical operation are a logical NOT operation and a logical AND operation. Optionally, each of the one or more processing circuitries is part of an interconnected computing grid, comprising some of the plurality of reconfigurable logical elements of the interconnected computing grid connected by some of the plurality of configurable data routing junctions.

As used herewithin, the term dataflow means a computer programming paradigm that models at least part of a software program as a directed graph of data flowing between operations such that a series of operations is applied to each data element in a sequence of data elements. Optionally, configuring the one or more processing circuitries comprises generating a dataflow graph for each of the plurality of device threads, and for each of the plurality of device threads projecting the dataflow graph on part of the interconnected computing grid.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1A, showing a schematic block diagram 100A of an exemplary software program, according to some embodiments. In such embodiments, software program 101 comprises a task 110. Optionally, software program 101 comprises one or more other tasks (not shown). Optionally, task 110 comprises a plurality of sub-tasks, for example comprising sub-task 110A, sub-task 110B, sub-task 110C, sub-task 110D, sub-task 110E and sub-task 110F. Optionally, the plurality of sub-tasks are parallel (i.e., the plurality of sub-tasks is a plurality of parallel sub-tasks), such that to perform task 110 one or more of the plurality of parallel sub-tasks may be executed in parallel to each other, for example sub-task 110A may be executed in parallel to sub-task 110B.

Figure 1B:
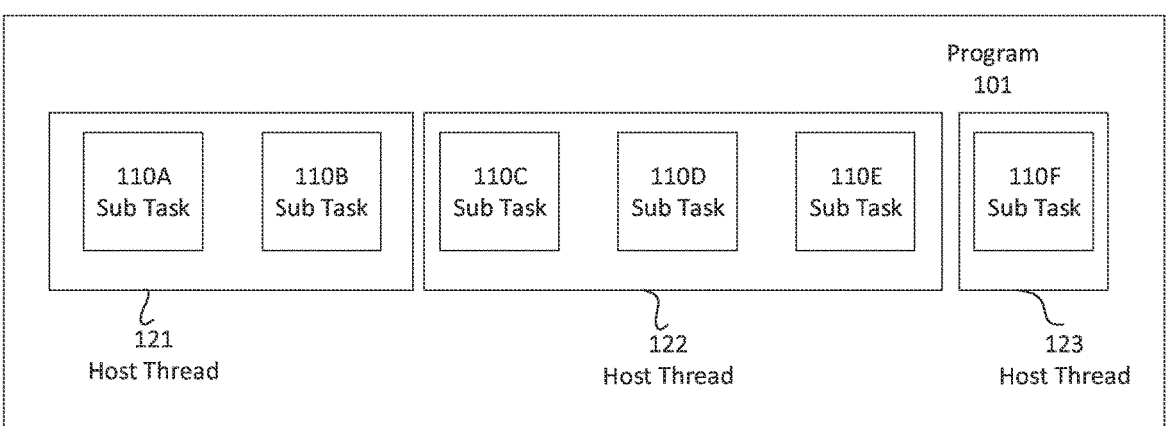

Reference is now made also to FIG. 1B, showing another schematic block diagram 100B of the exemplary software program, according to some embodiments. Optionally, software program 101 comprises a plurality of parallel host threads for executing the plurality of parallel sub-tasks, for example comprising host thread 121, host thread 122 and host thread 123. Optionally, each of the plurality of parallel host threads is for performing some of the plurality of parallel sub-tasks of task 110. In this example, host thread 121 is for performing sub-task 110A and sub-task 110B, host thread 122 is for performing sub-task 110C, sub-task 110D and sub-task 110E, and host thread 123 is for performing sub-task 110F.

To increase utilization of a plurality of processing circuitries and thus increase performance of a system executing software program 101, according to some embodiments described herein each of host thread 121, host thread 122 and host thread 123 is expanded to a respective plurality of device threads, each for performing one of the respective plurality of parallel sub-tasks associated with the host thread.

Figure 1C:
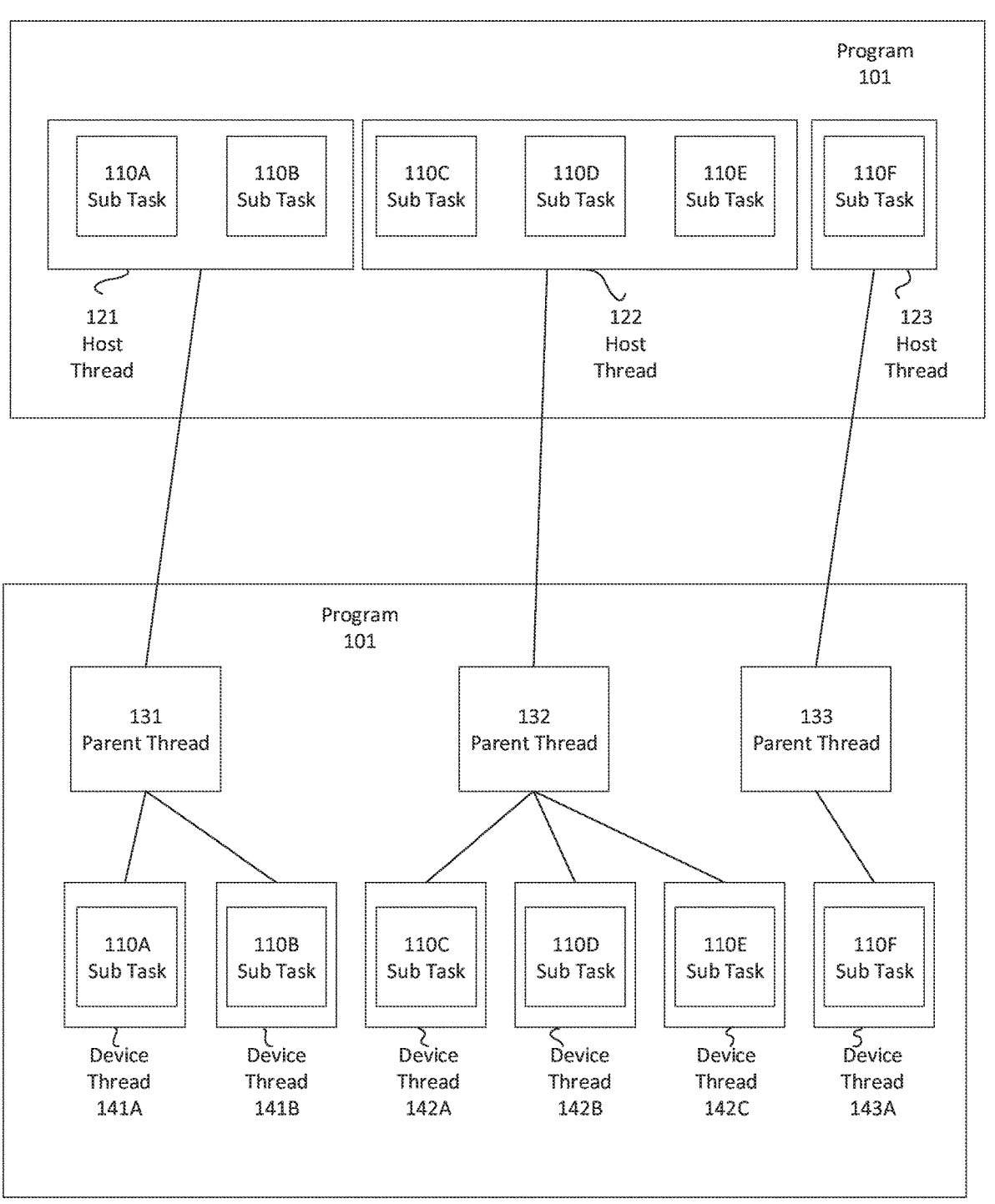
FIG. 1C is a schematic block diagram of the exemplary software program with expanded threads, according to some embodiments.

Reference is now made also to FIG. 1C, showing a schematic block diagram 100C of the exemplary software program with expanded threads, according to some embodiments. In such embodiments, host thread 121 is expanded to a first plurality of device thread comprising device thread 141A for performing sub-task 110A and device thread 141B for performing sub-task 110B. Optionally, a parent thread 131, associated with host thread 121 is generated for communicating with device thread 141A and device thread 141B. Optionally, generating parent thread 131 comprises removing from sub-task 141A and sub-task 141B from host thread 121, such that parent thread 131 has reduced functionality compared to host thread 121. When sub-task 110A and sub-task 110B are both performed by host thread 121, sub-task 110A and sub-task 110B cannot be executed in parallel. Executing device thread 141A in parallel to executing device thread 141B enables executing sub-task 110A in parallel to executing sub-task 110B.

Similarly, in such embodiments host thread 122 is expanded into device thread 142A for performing sub-task 110C, device thread 142B for performing sub-task 110D and device thread 142C for performing sub-task 110E, allowing sub-task 110C, sub-task 110D and sub-task 110E to be executed in parallel to each other. Optionally, a parent thread 132, associated with host thread 122 is generated for communicating with device thread 141C, device thread 141D and device thread 141E. Further similarly, in such embodiments host thread 123 may be expanded to device 143A for performing sub-task 110F and a parent thread 133, associated with host thread 123, is optionally generated for communicating with device thread 123. Expanding a host thread for performing one sub-task into a device thread and a parent thread enabled performing the one sub-task on another processing circuitry while maintaining access to one or more shared resources of a processing circuitry executing the parent thread. This allows reducing computation load from the processing circuitry while maintain access by the sub-task to the one or more shared resources.

Figure 2:
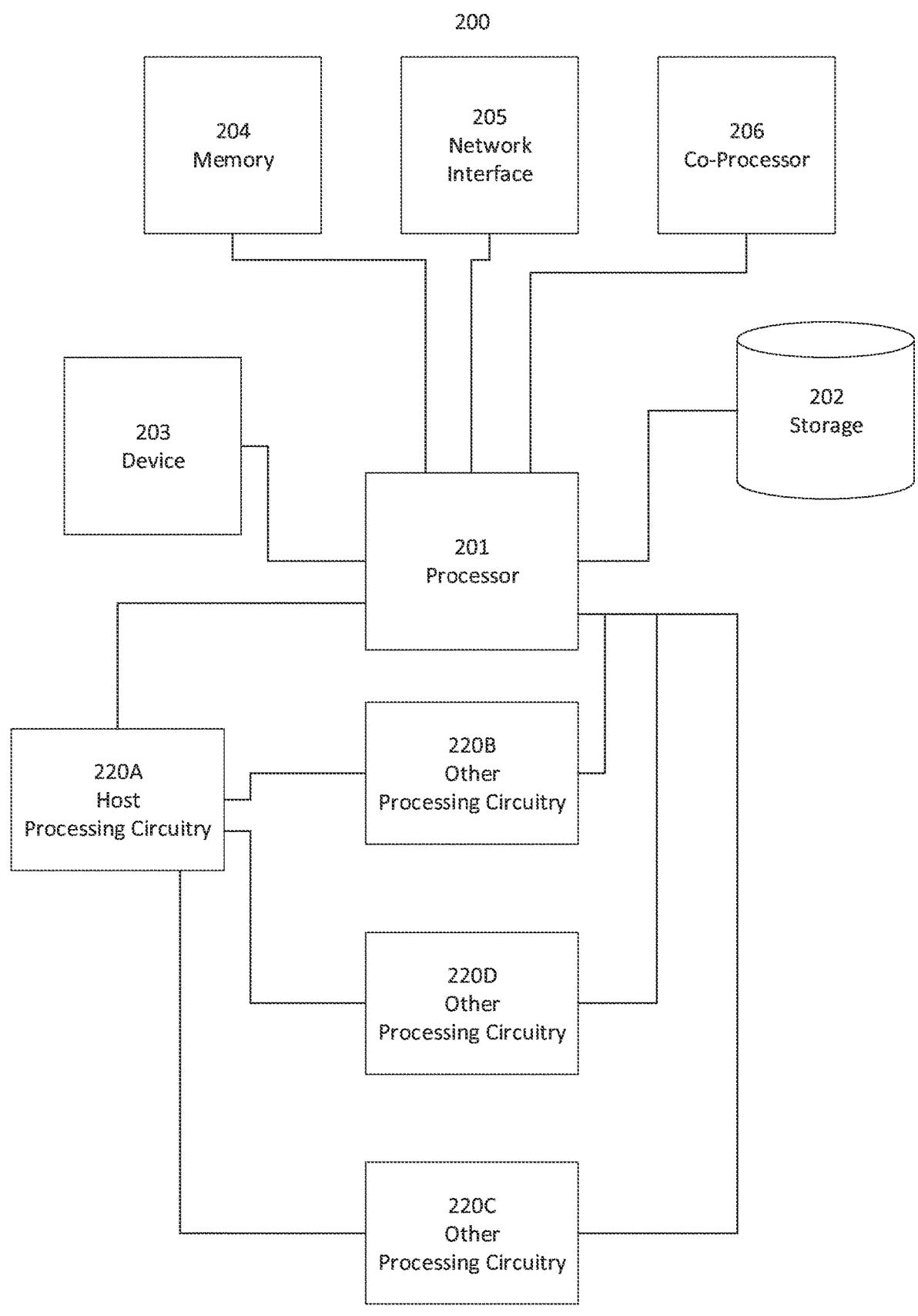
FIG. 2 is a schematic block diagram of an exemplary system, according to some embodiments.

Reference is now made also to FIG. 2, showing a schematic block diagram of an exemplary system 200, according to some embodiments. In such embodiments, at least one hardware processor 201 is connected to a plurality of processing circuitries, for example comprising host processing circuitry 220A and one or more other processing circuitries, for example comprising other processing circuitry 220B, other processing circuitry 220C and other processing circuitry 220D. Optionally, host processing circuitry 220A is connected to each of the one or more other processing circuitries.

For brevity, henceforth the term "processing unit" is used to mean "at least one hardware processor". Some examples of a processing unit are a central processing unit (CPU), a quantum processing unit, a microcontroller, and a System-on-chip. The processing unit may have more than one processing core. Optionally, at least some of the plurality of processing circuitries are a plurality of cores of a multi core processing unit. Optionally, at least one of the plurality of processing circuitries is one of: a digital signal processor (DSP), a graphics processing unit (GPU), a field-programmable gate array (FPGA), and a tensor processing unit (TPU).

Optionally, processing unit 201 is connected to at least one shared memory 204, shared by all threads of software program 101 when executed by system 200. Some examples of a shared memory component are a dynamic random access memory (DRAM) components, and a static random access memory (SRAM). Additionally, or alternatively, at least one shared memory 204 may be connected to host processing circuitry 220A.

Optionally, processing unit 201 is connected to at least one digital communication network interface 205, optionally shared by all threads of software program 101 when executed by system 200. Optionally, at least one digital communication network interface 205 is connected to a local area network, for example an Ethernet network or a Wi-Fi network. Optionally, at least one digital communication network interface 205 is connected to a wide area network, for example a cellular network or the Internet. Additionally, or alternatively, at least one digital communication network interface 205 may be connected to host processing circuitry 220A.

Optionally, processing unit 201 is connected to at least one co-processor 206, optionally shared by all threads of software program 101 when executed by system 200. Some examples of a co-processor are a voice processor and a graphics processor. Additionally, or alternatively, at least one co-processor 206 may be connected to host processing circuitry 220A.

Optionally, processing unit 201 is connected to at least one non-volatile digital storage 202, optionally shared by all threads of software program 101 when executed by system 200. Some examples of a non-volatile digital storage include, but are not limited to, a hard disk drive, a solid state drive, a storage network and a network connected storage. Additionally, or alternatively, at least one non-volatile digital storage 202 may be connected to host processing circuitry 220A.

Optionally, processing unit 201 is connected to at least device 203, optionally shared by all threads of software program 101 when executed by system 200. Some examples of a device include, but are not limited to, a display device for example a monitor, and an input device, for example a mouse or a computer drawing pad. Additionally, or alternatively, at least device 203 may be connected to host processing circuitry 220A.

Figure 3:
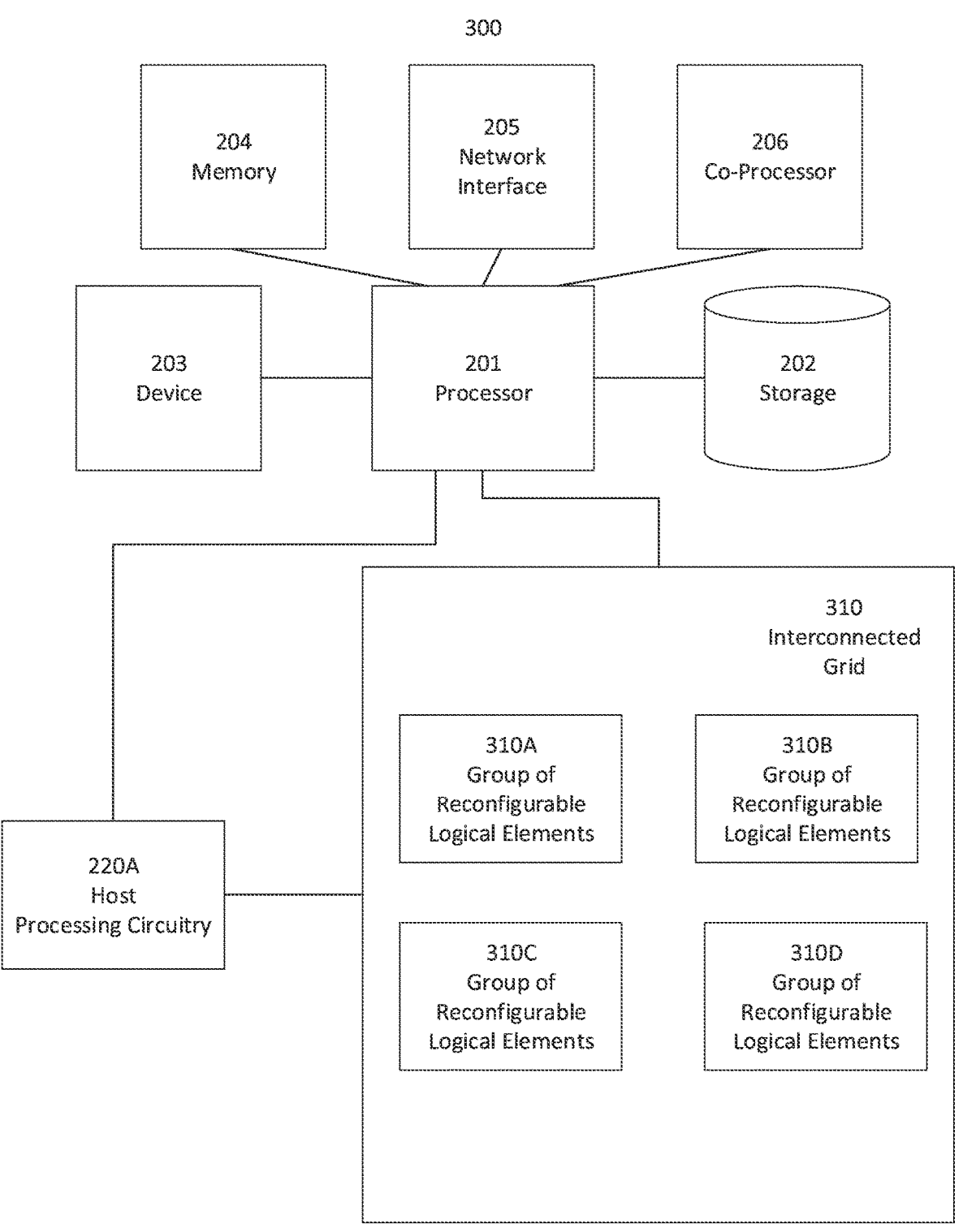
FIG. 3 is a schematic block diagram of another exemplary system, according to some embodiments.

Reference is now made also to FIG. 3, showing a schematic block diagram of another exemplary system 300, according to some embodiments. Optionally, the one or more other processing circuitries are interconnected computing grid 310. Optionally, host processing circuitry 220A is connected to interconnected computing grid 310. Optionally, interconnected computing grid 310 comprises a plurality of reconfigurable logical elements. An example of a reconfigurable logical element is processing circuitry that may be configured to perform one of an identified set of mathematical and logical operations. Some examples of a mathematical operation are addition and subtraction. Some examples of a logical operation are a logical NOT operation and a logical AND operation. Optionally, the plurality of reconfigurable logical elements is connected by a plurality of configurable data routing junctions. Optionally, the plurality of reconfigurable logical elements is organized in a plurality of groups of logical elements, each comprising some of the plurality of logical elements connected by some of the plurality of configurable data routing junctions, for example comprising group of reconfigurable logical elements 310A, group of reconfigurable logical elements 310B, group of reconfigurable logical elements 310C, and group of reconfigurable logical elements 310D.

To execute software program 101, system 200 and additionally or alternatively system 300 may implement the following optional method.

Figure 4:
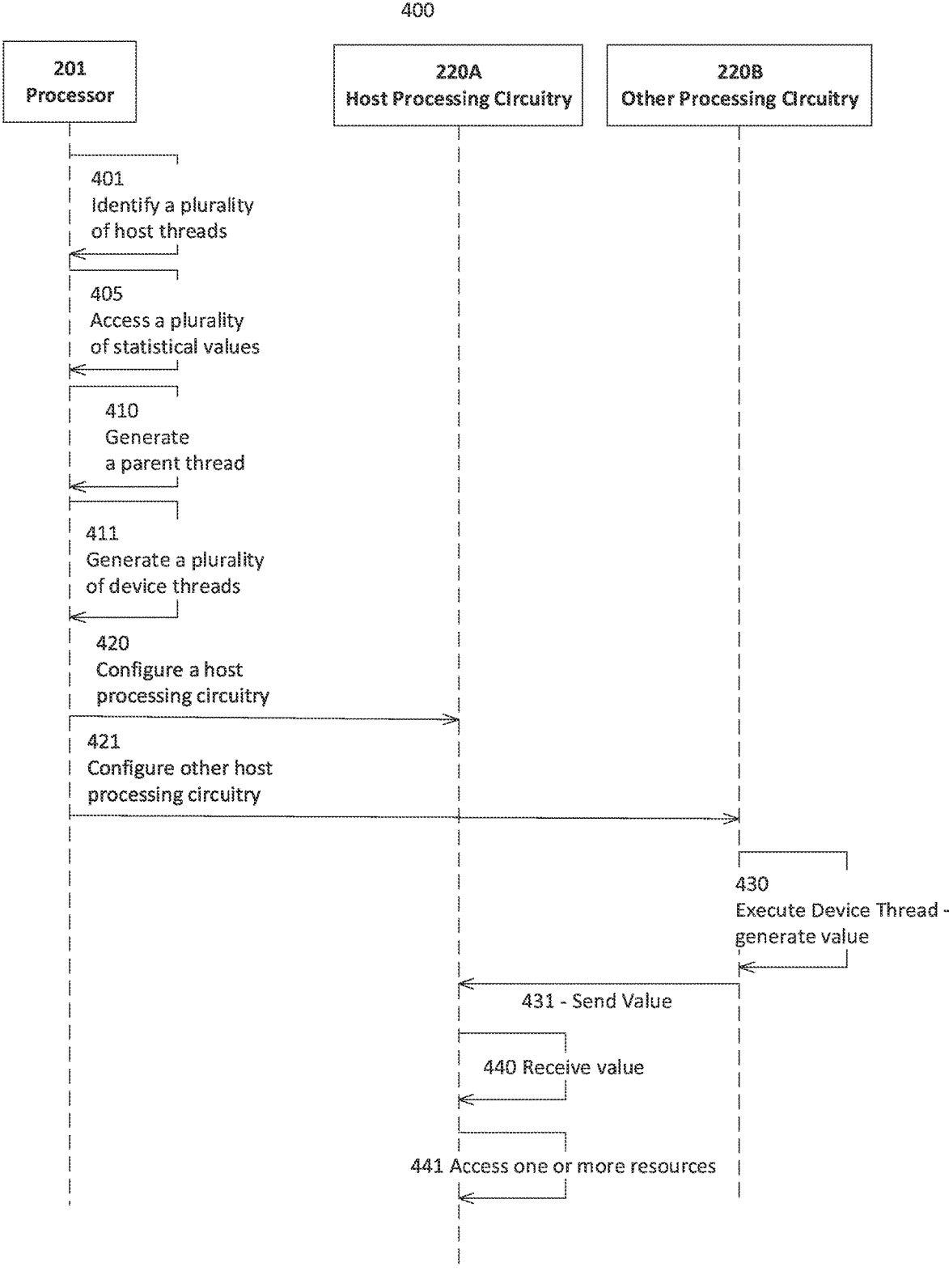
FIG. 4 is a sequence diagram of an optional flow of operations, according to some embodiments.

Reference is now made also to FIG. 4, showing a sequence diagram of an optional flow of operations 400, according to some embodiments. In such embodiments, in 401 processing unit 201 identifies in software program 101 a plurality of parallel host threads comprising host thread 121, host thread 122 and host thread 123. Optionally, each host thread of the plurality of parallel host threads is for performing a set of parallel sub-tasks associated with the host thread, where each set of parallel sub-tasks is some of the plurality of parallel sub-tasks of task 110, comprising sub-task 110A, sub-task 110B, sub-task 110C, sub-task 110D, sub-task 110E and sub-task 110F. For example, for host thread 121 the set of parallel sub-tasks associated therewith comprises sub-task 110A and sub-task 110B. Optionally, the plurality of parallel host thread are such that to perform task 110 the plurality of parallel host threads may be executed in parallel to each other, i.e. one of the plurality of parallel host threads may executed while another of the plurality of host threads is executed.

Optionally, processing unit 201 identifies at least some host threads of the plurality of parallel host threads in source code of software program 101 such that each of the at least some host threads will perform one or more of the plurality of parallel sub-tasks when software program 101 is executed. Optionally, the source code of software program 101 comprises a marking that is indicative of at least some of the plurality of parallel sub-tasks. Optionally, the marking is a feature of a programming language of the source code of software program 101, for example Massachusetts Institute of Technology MultiLisp. Optionally, the marking complies with a multithreading framework. Some examples of a multithreading framework are Intel Parallel studio, OpenACC, Kokkos development environment, NVIDIA CUDA, SYCL framework, and Khronos Group OpenCL. Optionally, the marking in the source code is implemented using one or more multithreading application programing interfaces (API). Some examples of a multithreading API are: OpenMP architecture Review Board Open Multi-Processing (OpenMP) API, OpenACC, Message Passing Interface (MPI) and Intel Threading Building Blocks (TBB).

Optionally, processing unit 201 identifies the at least some host threads according to the marking in the source code of software program 101. Optionally, processing unit 201 identifies the at least some host threads when compiling software program 101.

Optionally, processing unit 201 identifies at least some other host threads of the plurality of parallel host threads in a binary code of software program 101. Optionally, processing unit 201 identifies the at least some other host thread while executing software program 101. Optionally, processing unit 201 identifies the plurality of parallel host threads while executing software program 101.

Optionally, the binary code of software program 101 comprises another marking that is indicative of one or more code regions of software program 101. Optionally, one or more of the plurality of host threads is configured for executing the one or more code regions. Optionally, processing unit 201 identifies the at least some other host threads according to the other marking.

For a host thread of the plurality of parallel host threads, in 411 processing unit 201 optionally generates a plurality of device threads, each for one of the respective set of parallel sub-tasks associated with the host thread. In this example, for host thread 121, in 411 processing unit 201 generates device thread 141A for executing sub-task 110A and device thread 141B for executing sub-task 110B. Optionally, processing unit 201 associates the plurality of device threads with the host thread for which they were generated. For example, device thread 141A and device thread 141B are associated with host thread 121.

Optionally, in 405 processing unit 201 accesses a plurality of statistical values collected while executing software program 101. For example, software program 101 may comprise a plurality of telemetry instructions for collecting at least some of the plurality of statistical values. Some examples of a statistical value are a statistical value indicative of a value of a program counter, for example a value of a program counter when executing software program 101, a statistical value indicative of executing a loop, a statistical value indicative of invoking a first execution block for a second execution block, i.e. a statistical value optionally indicative of executing over a barrier between execution blocks of software program 101, a statistical value indicative of a data value, for example a frequently used data value or a variable data value, a statistical value indicative of a range of data values, a statistical value indicative of a pattern of a plurality of data values, a statistical value indicative of memory utilization and a statistical value indicative of a bandwidth of a plurality of memory accesses. Some possible metrics of memory utilization include how full a memory is. Some possible metrics of a bandwidth of a plurality of memory accesses include an average bandwidth of the plurality of memory access and a peak bandwidth of the plurality of memory accesses.

Optionally, in 411 processing unit 201 generates the plurality of device threads for the host thread according to the plurality of statistical values.

In 410, processing unit 201 optionally generates for the host thread a parent thread for communicating with the plurality of device threads. For example, processing unit 201 may generate in 410 parent thread 131 for communicating with device thread 141A and device thread 141B. Optionally, processing unit 201 associates the host thread with the parent thread, for example parent thread 131 may be associated with host thread 121. Optionally, parent thread 131 is associated with device thread 141A and device thread 141B. Optionally, parent thread 131 has reduced functionality compared to host thread 121. Optionally, an aggregated amount of host threads and generate parent threads does not exceed a maximum amount of threads supported by the operating system of the system. Optionally, an amount of generated device threads does exceed the maximum amount of threads supported by the operating system of the system.

In 420, processing unit 201 optionally configures host processing circuitry 220A to execute parent thread 131. Optionally, host processing circuitry 220A is processing unit 201.

In 421, processing unit 201 optionally configures one or more other processing circuitry to execute in parallel the plurality of device threads, while host processing circuitry 220A executes the parent thread associated therewith. In this example, processing unit 201 optionally configures other processing circuitry 220B to execute device thread 141A while host processing circuitry 220A executes parent thread 131, and configures other processing circuitry 220C to execute device thread 141B while other processing circuitry 220B executes device thread 141B, while additionally host processing circuitry 220A executes parent thread 131.

When the one or more other processing circuitries are interconnected computing grid 310, processing unit 201 optionally configures group of reconfigurable logical elements 310A to execute device thread 141A while host processing circuitry 220A executes parent thread 121. Optionally, processing unit 201 configures group of reconfigurable logical elements 310B to execute device thread 141A while group of reconfigurable logical elements 310A executes device thread 141A and host processing circuitry 220A executes parent thread 121.

As used herewithin, the term "projection of a dataflow graph" is used to mean configuring at least part of an interconnected computing grid to implement the dataflow graph. When the one or more other processing circuitries are interconnected computing grid 310, configuring the other processing circuitry for a host thread optionally comprises projecting one or more dataflow graphs onto interconnected computing grid 310.

Figure 5:
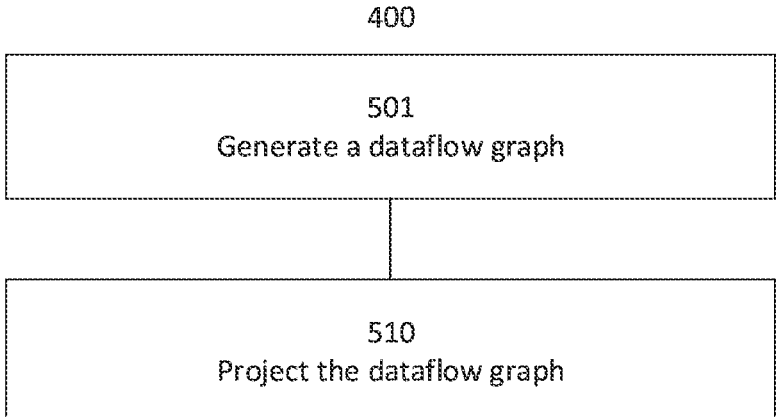
FIG. 5 is a flowchart schematically representing an optional flow of operations for configuring a processing circuitry, according to some embodiments.

Reference is now made also to FIG. 5, showing a flow-chart schematically representing an optional flow of operations 500 for configuring a processing circuitry, according to some embodiments. In such embodiments, in 501 processing circuitry 201 generates a dataflow graph for each of the plurality of device threads associated with the host thread. In this example, for host thread 121 processing unit 201 generates a first dataflow graph for device thread 141A and generates a second dataflow graph for device thread 141B. Optionally, in 510, for each host thread processing unit 201 projects each of a plurality of dataflow graphs generated in 510 on part of interconnected computing grid 310. In this example, processing unit 201 projects the first dataflow graph onto group of reconfigurable logical elements 310A and projects the second dataflow graph onto group of reconfigurable logical elements 310A. Optionally, projecting a dataflow graph onto one of the plurality of groups of reconfigurable logical elements of interconnected computing grid 310, for example group of reconfigurable logical elements 310A comprises reconfiguring at least some of the group of reconfigurable logical elements.

Reference is now made again to FIG. 4.

Optionally, processing unit 201 repeats 410, 411, 420 and 421 for each of the plurality of parallel host threads. Thus, optionally processing unit 201 generates in 410 parent thread 132 associated with host thread 122 and parent thread 133 associated with host thread 123. Optionally, in 411 processing unit 201 generates device thread 142A, device thread 142B and device thread 142C associated with host thread 122, and device thread 143A associated with host thread 123.

Optionally, processing circuitry 201 executes 410, 411, 420 and 421 for at least one of the plurality of parallel host threads while executing software program 101. Optionally, processing circuitry 201 executes 410, 411, 420 and 421 for at least one other of the plurality of parallel host threads before executing software program 101.

Optionally, processing circuitry 201 configures in 420 host processing circuitry 220A to execute parent thread 131 instead of executing host thread 121. Optionally, parent thread 131 comprises part of host thread 121's functionality, for example access to one or more shared computer resources of software program 101 connected to host processing circuitry 220A, such that parent thread 131 preserves coherency of software program 101 on host processing circuitry 220A.

Optionally, processing unit 201 configures in 420 host processing circuitry 220A to execute parent thread 132 and parent thread 133 in addition to executing parent thread 131. Optionally, processing unit 201 configures host processing circuitry 220A to execute parent thread 131 instead of host thread 121, parent thread 132 instead of host thread 122 and parent thread 133 instead of host thread 123. In this way, host processing circuitry 220A may preserve coherency of software program 101 while performing some of the plurality of sub-tasks of task 110 on one or more other processing circuitry.

To increase utilization of the one or more other processing circuitries, processing unit 201 optionally configures one of the one or more other processing circuitries to execute more than one device thread, optionally the more than one device threads where one device thread is associated with one host thread of the plurality of parallel host threads and another device thread is associated with another host thread of the plurality of parallel host threads. For example, processing unit 201 optionally configures other processing circuitry 220B to execute device thread 141A and other processing circuitry 220C to execute device thread 141C while host processing circuitry 220A executes parent thread 131 and parent thread 132.

In 430, each of the one or more other processing circuitries executes the one or more device threads configured thereto in 421, for example other processing circuitry 220B executes device thread 141A. In another example, in 430 group of reconfigurable logical elements 310A executes device thread 141A. Optionally, in 430 other processing circuitry 220B generates one or more values by executing device thread 141. Optionally, in 440 host processing circuitry 220A receives the one or more values and in 441 host processing circuitry 220A optionally accesses one or more shared computing resources connected thereto, in response to receiving the one or more values. For example, when host processing circuitry 220A is connected to at least one shared memory 204, the one or more values may be one or more data values to store in a memory area of at least one shared memory 204. In this example, host processing circuitry 220A accesses the memory area on at least one shared memory 204 in response to receiving the one or more values.

In another example, the one or more values may comprise a handle for accessing a shared device connected to host processing circuitry 220A, and in response to receiving the one or more values optionally host processing circuitry 220A accesses the shared device connected thereto, optionally using the one or more values. For example, host processing circuitry 220A may access at least one non-volatile storage. Optionally, host processing circuitry 220A accesses co-processor 206 in response to receiving the one or more values, for example when co-processor 206 is a graphic processor and the one or more values comprise a digital image. Other examples of a shared computing resource accessed by host processing circuitry 220A in response to the one or more values include at least one digital communication network interface 205 and at least one device 203. Optionally the one or more values are one or more data values to provide to the shared computing resource, for example a data packet to send via at least one digital communication network interface 205 or a message to display when device 203 is a display device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant processing circuitries and markings will be developed and the scope of the terms "processing circuitry" and "marking" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for executing a software program, comprising:

identifying in a software program a plurality of host threads, each for performing some of a plurality of parallel sub-tasks of a task of the software program; and for each of the plurality of host threads:

generating a plurality of device threads, each associated with the host thread, each for one of the respective some of the plurality of parallel tasks associated thereof;

generating a parent thread having reduced functionality compared to the host thread, wherein the parent thread is associated with the host thread for communicating with the plurality of device threads, wherein the parent thread is generated by removing from the host thread the respective some of the plurality of parallel tasks of each of the plurality of device threads, and wherein the parent thread preserves coherency of the software program on a host processing circuitry;

configuring a host processing circuitry to execute the parent thread; and configuring at least one other processing circuitry, connected to the host processing circuitry, to execute in parallel the plurality of device threads while the host processing circuitry executes the parent thread; and for at least one of the plurality of host threads:

receiving by the parent thread associated with the at least one host thread at least one value from the at least one other processing circuitry, the at least one value generated by the at least one other processing circuitry executing at least one of the plurality of device threads associated with the at least one host thread.

2. The method of claim 1, wherein at least some host threads of the plurality of host threads are identified in a source code of the software program.

3. The method of claim 2, wherein the source code of the software program comprises a marking, indicative of at least some of the plurality of parallel sub-tasks; and wherein identifying the at least some host threads is according to the marking.

4. The method of claim 3, wherein the marking in the source code is implemented using at least one multithreading application programming interface (API) selected from a group of multithreading APIs consisting of: OpenMP Architecture Review Board Open Multi-Processing (OpenMP) API, OpenACC, Message Passing Interface (MPI), and Intel Threading Building Blocks (TBB).

5. The method of claim 1, wherein at least some other host threads of the plurality of host threads are identified in a binary code of the software program.

6. The method of claim 5, wherein the binary code of the software program comprises another marking, indicative of at least one code region;

wherein at least one of the plurality of host threads is configured for executing the at least one code region; and wherein identifying the at least some other host threads is according to the other marking.

7. A system for executing a software program, comprising at least one hardware processor adapted for:

identifying in a software program a plurality of host threads, each for performing some of a plurality of parallel sub-tasks of a task of the software program; and for each of the plurality of host threads:

generating a plurality of device threads, each associated with the host thread, each for one of the respective some of the plurality of parallel tasks associated thereof;

generating a parent thread having reduced functionality compared to the host thread, wherein the parent thread is associated with the host thread for communicating with the plurality of device threads, wherein the parent thread is generated by removing from the host thread the respective some of the plurality of parallel tasks of each of the plurality of device threads, and wherein the parent thread preserves coherency of the software program on a host processing circuitry;

configuring a host processing circuitry to execute the parent thread; and configuring at least one other processing circuitry, connected to the host processing circuitry, to execute in parallel the plurality of device threads while the host processing circuitry executes the parent thread;

wherein for at least one of the plurality of host threads, executing in parallel the respective plurality of device threads associated therewith comprises receiving by the parent thread associated therewith at least one value from the at least one other processing circuitry, the at least one value generated by the at least one other processing circuitry executing at least one of the plurality of device threads associated with the at least one host thread.

8. The system of claim 7, wherein the host processing circuitry is the at least one hardware processor.

9. The system of claim 8, wherein the at least one hardware processor is further adapted for generating the plurality of device threads, generating the parent thread, configuring the host processing circuitry and configuring the least one other processing circuitry while executing the software program.

10. The system of claim 9, wherein the at least one hardware processor is further adapted for identifying the plurality of host threads while executing the software program.

11. The system of claim 7, wherein the at least one other processing circuitry is an interconnected computing grid.

12. The system of claim 11, wherein for each of the plurality of host threads configuring the at least one other processing circuitry comprises, for each of the plurality of device threads associated with the host thread:

generating a dataflow graph; and projecting the dataflow graph on part of the interconnected computing grid.

13. The system of claim 12, wherein the interconnected computing grid comprises a plurality of reconfigurable logical elements; and wherein projecting the dataflow graph on part of the interconnected computing grid comprises reconfiguring at least some of the reconfigurable logical elements.

14. The system of claim 7, further comprising at least one shared computing resource connected to the host processing circuitry; and wherein the host processing circuitry is further configured for accessing the at least one shared computing resource in response to the at least one parent thread receiving the at least one value from the at least one other processing circuitry.

15. The system of claim 14, wherein the at least one shared computing resource is selected from a group of computing resources consisting of: a memory area, a non-volatile storage, a co-processor, a digital communication network interface, a monitor, and an input device.

16. The system of claim 7, wherein the at least one hardware processor is further adapted for accessing a plurality of statistical values collected while executing the software program;

wherein the plurality of device threads is generated further according to the plurality of statistical values.

17. The system of claim 16, wherein the software program comprises a plurality of telemetry instructions for collecting at least some of the plurality of statistical values.

18. The system of claim 16, wherein at least one of the plurality of statistical values is selected from the group of statistical values consisting of: a statistical value indicative of a value of a program counter, a statistical value indicative of executing a loop, a statistical value indicative of invoking a first execution block from a second execution block, a statistical value indicative of a data value, for example a frequently used data value or a variable data value, a statistical value indicative of a range of data values, a statistical value indicative of a pattern of a plurality of data values, a statistical value indicative of memory utilization, and a statistical value indicative of a bandwidth of a plurality of memory accesses.

* * * * *